US012743324B2

(12) United States Patent
Walters et al.

(10) Patent No.: US 12,743,324 B2
(45) Date of Patent: Sep. 22, 2026

(54) ALTERING PROCESSING CHARACTERISTICS BASED ON THERMAL DATA

(71) Applicant: International Business Machines Corporation, Armonk, NY (US)

(72) Inventors: Craig R. Walters, Poughkeepsie, NY (US); Vesselina Papazova, Poughkeepsie, NY (US); Arkadiy O. Tsfasman, Wappingers Falls, NY (US); Joanna Sharlyn Escanio, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 18/804,640

(22) Filed: Aug. 14, 2024

(65) Prior Publication Data

US 2026/0050493 A1 Feb. 19, 2026

(51) Int. Cl.
*G06F 9/50* (2006.01)

(52) U.S. Cl.
CPC .......... *G06F 9/5094* (2013.01); *G06F 9/5027* (2013.01); *G06F 2209/508* (2013.01)

(58) Field of Classification Search
CPC .. G06F 9/5094; G06F 11/3058; G06F 1/3203; G06F 9/5027; G06F 2209/508
See application file for complete search history.

(56) References Cited

U.S. PATENT DOCUMENTS 11,314,299 B2 4/2022 Leung et al.
11,934,249 B2 3/2024 Wang et al.
2003/0217296 A1 11/2003 Ma
2005/0278555 A1* 12/2005 Chaparro ................ G06F 1/206 712/E9.071
2007/0010963 A1* 1/2007 Gaskins ................ G06F 1/3287 702/132
2016/0124476 A1* 5/2016 Mittal ..................... G06F 1/324 713/320
2016/0147291 A1* 5/2016 Thomas .................. G06F 1/324 713/320
2019/0004575 A1* 1/2019 Khatri ..................... G06F 1/206
(Continued)

FOREIGN PATENT DOCUMENTS

IN 202441008271 2/2024

OTHER PUBLICATIONS

Anuradha et al., "Dynamic Adaptive Processing System Fro Energy-Efficient Cloud Computing", India Patent Application filed Feb. 7, 2024, Assignee Panimalar Eng College, Abstract and 1st independent claim only.
(Continued)

*Primary Examiner* — Hyun Soo Kim
(74) *Attorney, Agent, or Firm* — CANTOR COLBURN LLP; Edward Wixted

(57) ABSTRACT

An example operation may include at least one of receiving thermal measurements from at least one thermal sensor embedded with a plurality of processing cores of a multicore processor while the plurality of processing cores process workloads, modifying operating characteristics of the plurality of processing cores based on the thermal measurements to generate modified operating characteristics, and dispatching a workload to the plurality of processing cores based on the modified operating characteristics.

20 Claims, 12 Drawing Sheets

(56) References Cited

U.S. PATENT DOCUMENTS

| | | | | |
|---|---|---|---|---|
| 2019/0064893 | A1* | 2/2019 | Kumar | G06F 9/4893 |
| 2023/0042338 | A1* | 2/2023 | Kanakapura | G06F 1/206 |
| 2023/0043222 | A1* | 2/2023 | Park | G06F 9/4881 |
| 2024/0087486 | A1* | 3/2024 | Ellappan | G09G 3/001 |
| 2025/0278307 | A1* | 9/2025 | Eber | G06F 9/5094 |

OTHER PUBLICATIONS

Aydin et al., "Power-Aware Scheduling for Periodic Real-Time Tasks", IEEE Transactions on Computers, vol. 53, No. 5, May 2004.
Cumplido-Parra et al., "High Performance Control System Processor", Research Gate, Jan. 2001.
Hsu et al., "A Power-Aware Run-Time System for High-Performance Computing", Los Alamos National Laboratory, Association for Computing Machinery, Nov. 12-18, 2005.
Matějka et al, "Power-Aware Scheduling Algorithm for Host", Jun. 30, 2018.
Mayer et al., "From Heat to Power: Assessing Thermoelectric Energy Harvesting for Self-Sustainable Sensors", Research Gate, Dec. 2023.
Sarbu et al., "A Comprehensive Review of Thermal Energy", Research Gate, Jan. 2018.
Sharar et al., "High Capacity High-Power Thermal Energy Storage Using Solid-Solid Martensitic Transformations", Research Gate, Nov. 2011.
Unknown, "Anticipatory Product Development Using Design Suggestions", An IP.com Prior Art Database Technical Disclosure, IP.com No. IPCOM000252104DIP.com Electronic Publication Date: Dec. 15, 2017.
Unknown, "Energy Saving Through Temperature Aware Storage Placementand Workload", An IP.com Prior Art Database Technical Disclosure, IP.com No. IPCOM000206737DIP.com Electronic Publication Date: May 5, 2011.
Unknown, "System and Method for Database System Historical Resource Utilization Modeling and Prediction (DBSHRUMP) BasedOn Workload Characterization and Runtime Monitoring Information", An IP.com Prior Art Database Technical DisclosureOriginal Publication Date: Jul. 27, 2009, IP.com No. IPCOM000185470D, IP.com Electronic Publication Date: Jul. 27, 2009.
Vaid, "Method for storage analysis and testing based on workload characterization data", An IP.com Prior Art Database Technical Disclosure, Original Publication Date: Apr. 26, 2011, IP.com No. IPCOM000206443D, IP.com Electronic Publication Date: Apr. 26, 2011.

* cited by examiner

200B

Multi-Core Processor 230
244
Partition 240
Core # 0
Core # 1
Core # 2
Core # 3
Core # 4
Core # 5
Core # 6
Core # 7
Partition 242
Core # 0
Core # 1
Core # 2
Core # 3
Core # 4
Core # 5
Core # 6
Core # 7
Firmware
250
Thermal Profile Storage
220

300A
Workload
302
Operating System
310
Dispatch
Profile 322
324
Thermal Profile Database
320
Multi-Core Processor 330
Core # 0
Core # 1
Core # 2
Core # 3
Core # 4
Core # 5
Core # 6
Core # 7
331
332

Profile 322

324

| 1 | 2 | 1 | 1 |
|---|---|---|---|
| 3 | 1 | 1 | 1 |
| 3 | 5 | 6 | 5 |
| 2 | 3 | 4 | 2 |

Thermal Readings

Firmware 340

Update Profile

Thermal Profile Database 320

Profile 322b

324b

| 5 | 6 | 1 | 3 |
|---|---|---|---|
| 5 | 5 | 2 | 2 |
| 1 | 1 | 5 | 4 |
| 1 | 1 | 1 | 1 |

300C
Workload
304
Operating System
310
Dispatch
Profile 322b
5 6 1 3
5 5 2 2
1 1 5 4
1 1 1 1
Thermal Profile Storage
320
Multi-Core Processor 330
Core # 0
Core # 1
Core # 2
Core # 3
Core # 4
Core # 5
Core # 6
Core # 7
333
334

400B
Task A Profile 430
1 2 3 4
3 1 1 4
3 1 1 1
2 3 4 2
Task B Profile 432
1 1 5 6
1 3 4 1
1 4 2 3
1 3 4 2
Task C Profile 434
1 1 1 1
3 3 2 1
3 2 3 4
4 3 4 2
Unit (Task A) 412
Unit (Task B) 414
Unit (Task C) 416
Operating System 420
Dispatch
Task A
Task B
Task C
441
Multi-Core Processor 440
Core # 0
Core # 1
Core # 0
Core # 1
Core # 2
Core # 3
Core # 2
Core # 3
442
Core # 4
Core # 5
Core # 4
Core # 5
Core # 6
Core # 7
Core # 6
Core # 7
443

500

510

600

610

ALTERING PROCESSING CHARACTERISTICS BASED ON THERMAL DATA

BACKGROUND

Processing chips or processor chips are typically designed with multiple processing cores. Processing characteristics of the multiple processing cores are usually set during manufacturing thereby preventing changes to the cores during runtime operation. For example, specific types of work may be designated to specific cores based on the set processing characteristics. However, during operation, the cores may operate differently than expected or in manners that were not foreseen. As an example, some cores may draw more power and become hotter than other cores when performing similar types of work. When the temperature within a core reaches a certain level, it can degrade the performance of the core and/or may cause the core to stop working.

SUMMARY

One example embodiment provides an apparatus that includes a memory and a processor communicatively coupled to the memory, where the processor may perform at least one of receive sensor readings from at least one thermal sensor embedded with a plurality of processing cores of a multicore processor while the plurality of processing cores process workloads, modify operating characteristics of the plurality of processing cores based on the sensor readings from the at least one thermal sensor to generate modified operating characteristics, and dispatch a workload to the plurality of processing cores based on the modified operating characteristics.

Another example embodiment provides a method that includes at least one of receiving sensor readings from at least one thermal sensor embedded with a plurality of processing cores of a multicore processor while the plurality of processing cores process workloads, modifying operating characteristics of the plurality of processing cores based on the sensor readings from the at least one thermal sensor to generate modified operating characteristics, and dispatching a workload to the plurality of processing cores based on the modified operating characteristics.

A further example embodiment provides a computer-readable storage medium that includes instructions which when executed by a processor cause the processor to perform at least one of receiving sensor readings from at least one thermal power sensor embedded with a plurality of processing cores of a multicore processor while the plurality of processing cores process workloads, modifying operating characteristics of the plurality of processing cores based on the sensor readings from the at least one thermal power sensor to generate modified operating characteristics, and dispatching a workload to the plurality of processing cores based on the modified operating characteristics.

One example embodiment provides an apparatus that includes a memory and a processor communicatively coupled to the memory, where the processor may perform at least one of receive sensor readings from at least one thermal sensor embedded with a plurality of processing cores of a multicore processor while the plurality of processing cores process workloads, modify operating characteristics of the plurality of processing cores based on the sensor readings from the at least one thermal sensor to generate modified operating characteristics, and divide a workload into at least two units of work and dispatch the at least two units of work to at least two processing cores of the plurality of processing cores, based on the modified operating characteristics.

Another example embodiment provides a method that includes at least one of receiving sensor readings from at least one thermal sensor embedded with a plurality of processing cores of a multicore processor while the plurality of processing cores process workloads, modifying operating characteristics of the plurality of processing cores based on the sensor readings from the at least one thermal sensor to generate modified operating characteristics, and dividing the workload into at least two units of work and dispatching the at least two units of work to at least two processing cores of the plurality of processing cores, based on the modified operating characteristics.

BRIEF DESCRIPTION OF THE DRAWINGS

FIG. 3B is another diagram that illustrates a process of modifying a thermal profile and dispatching tasks based on the modified thermal profile according to the examples and features of the instant solution.

DETAILED DESCRIPTION

Figure 1:
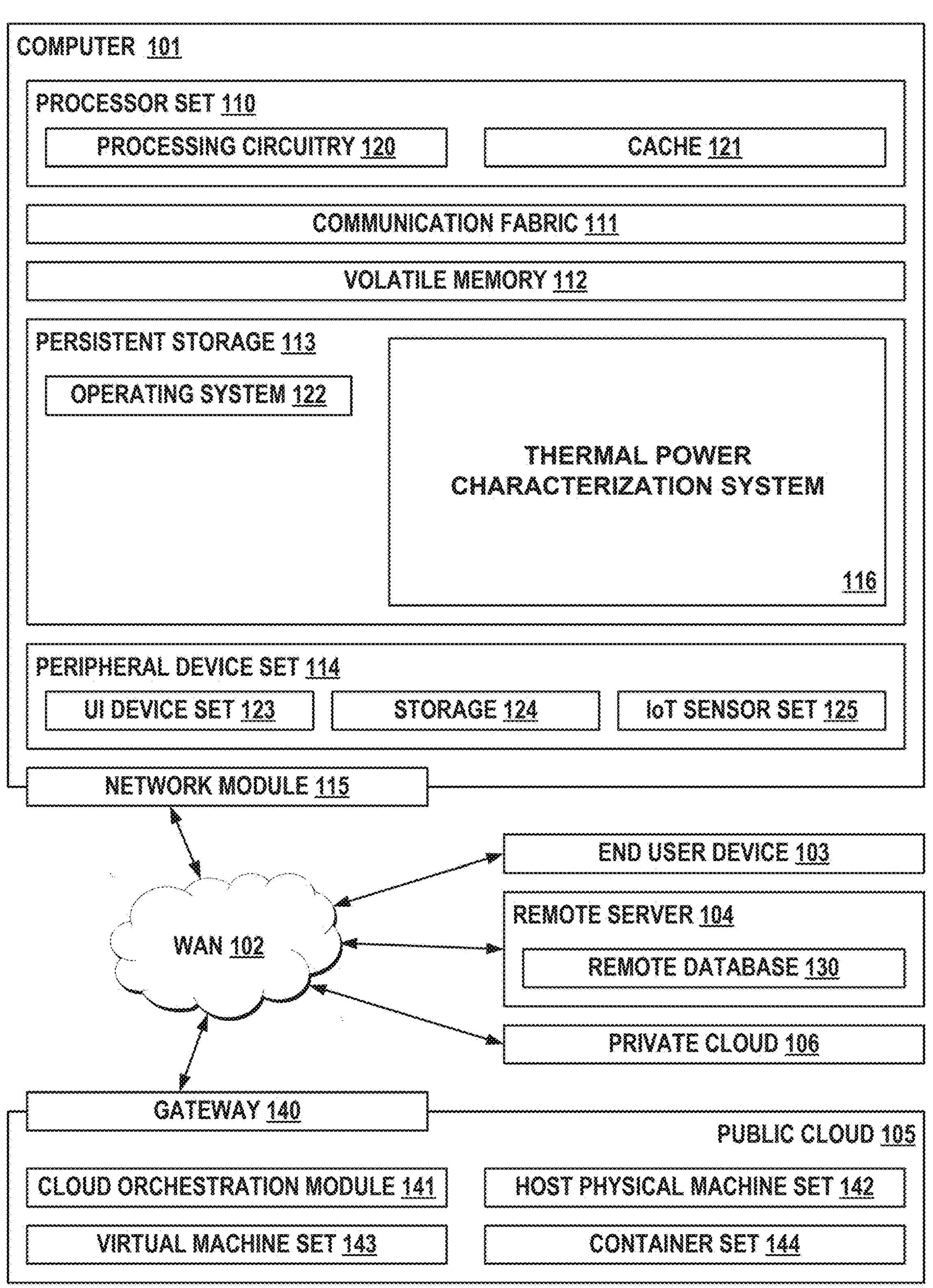
FIG. 1 is a diagram illustrating a computing environment according to an embodiment of the instant solution.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

According to an aspect of the example embodiments, there is provided a system that can alter processing characteristics of a multicore processor, processing chip, drawer, etc. based on thermal sensor readings obtained from one or more elements of the multicore processor. For example, thermal sensors may be embedded with one or more of the processing cores, a chip, a drawer, an input/output (I/O) adapter, a memory, or the like. During manufacture, a default thermal profile may be generated for the multicore processor based on how it operates on test loads. The default thermal profile may be provided with the multicore processor and may be accessible by an operating system, hypervisor, etc. of a computing system that has the multicore processor therein.

As the multicore processor is used, the thermal sensors may provide sensor readings (e.g., thermal measurements, readings, etc.) from the processing cores, chip, drawer, I/O adapter, memory, and the like, to the operating system. The operating system may use the sensor readings to update the default thermal profile based on runtime attributes of the multicore processor. As an example, the thermal profile may be stored within a table, where each cell in the table corresponds to a different processing core, however, embodiments are not limited thereto. In some cases, the table may store the sensor readings (temperature values, etc.). As another example, a machine learning model may receive the thermal measurements as input and generate an output value, score, ranking, etc. which identifies how hot the core is. For example, the machine learning model may output a value between 1 and 10, where 1 refers to a cold core and 10 refers to a hottest possible core.

The operating system may dispatch work to the multicore processor based on the thermal profile. Furthermore, the thermal profile may be iteratively updated based on thermal sensor readings that are continuously provided from the sensors on the multicore processor. Thus, the operating system may continuously refresh the thermal profile based on the most up-to-date characteristics of the processor.

In some embodiments, the system may track the thermal profile of the multicore processor for different types of workloads. For example, database transactions may cause cores to operate differently than when the cores perform other types of work such as calculations, scans, and the like. The system may manage a thermal profile for different types of work, thereby enabling a more fine-grained dispatch. For example, a workload may be split into multiple units of work based on multiple types of tasks to be performed within the workload. Here, the operating system can mix the processing of the workload among multiple cores based on the different types of work and the different thermal profiles for the different types of work further improving the performance of the multicore processor.

By monitoring the thermal properties of the processing cores, and dispatching work to the processing cores based on the thermal properties, the example embodiments provide a system that can dynamically adjust/alter the processing characteristics of a multicore processor after manufacture. In some embodiments, the multicore processor may be installed within a mainframe computer such as those that are commonly used to host a cloud computing environment. However, the multicore processor is not limited to any particular type of computing system and may be installed in a mainframe computer, a desktop computer, a mobile device, a smart-wearable device, a laptop, or the like.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Thus, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

FIG. 1 illustrates a computing environment 100 according to an embodiment of the instant solution. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions and associated data for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for executing at least some of the computer code involved in performing the inventive methods, such as a thermal power characterization system 116. In addition to block 116, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 116, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically the computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 116 in persistent storage 113.

COMMUNICATION FABRIC 111 is the signal conduction path that allows the various components of computer 101 to communicate with each other. Typically, this fabric comprises switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

For most processing devices with multiple cores, power profiling is locked during manufacturing. When an operating system, hypervisor, etc. dispatches work to the multiple cores, the dispatch is performed based on affinity (where the work was previously run) or based on default operating characteristics of the processor. In this case, the operating system is not aware of the efficiency of each of the cores, nor the temperature of each of the cores.

Processing inefficiencies are commonplace in such processing systems. For example, certain processor chips and/or cores can draw more power than others due to natural process variations. Within the industry this is considered a normal carrying cost and is regularly addressed by parts sorting, charactering/manufacturing tuning, or acceptance of inefficiencies. However, optimizing for sustainability after the normal acceptance criteria is overlooked by the industry. For example, a processor often "randomly dispatches work to enable cores on the chip without regard for the physical characteristics of each processing core.

In the example embodiments, thermal profiling can be used to dynamically alter/modify the processing characteristics of a multicore processor. In this case, thermal sensors may be embedded within the multicore processor. For example, thermal sensors may be embedded with one or more of a core (or cores), a cache, a chip, a drawer, a memory, an I/O adapter, and the like. Furthermore, firmware may monitor for process variations and generate thermal profiles (e.g., tables, etc.) based on the thermal measurements from the thermal sensors. In addition, the operating system of the computer may have access to the thermal profiles and may include embedded decision making that enables the operating system to use the thermal profiles to efficiently dispatch work to the cores based on the thermal profiles.

In some embodiments, the firmware may read the thermal sensors at periodic intervals including power on, and during operation. The firmware may generate heuristics (such as rankings, scores, etc.) representing the thermal measurements of each of the major components within the processor. Furthermore the firmware may update a default thermal profile for each of the cores, etc. The firmware may store the thermal profiles within a data store, database, etc. which is accessible to a hypervisor (for larger systems), and an operating system. The firmware may iteratively receive readings from the thermal sensors and refresh/update the thermal profile.

During runtime, the operating system (or the hypervisor) may dispatch work to the processing cores based on the thermal profile(s). For example, the operating system may monitor thermal profiles during runtime and dispatch work in a way that targets the most power efficient processors within its operation scope. The operating system may identify optimal cores for processing different types of work.

Furthermore, the operating system may identify an optimal mix of dispatchable work to cores for power/thermal optimization. This can be used to lower net power by intelligent dispatch. The operating system also has the potential to surface power per unit of work for computational sustainability tracking (e.g., Watts per customer transaction, etc.)

Figure 2A:
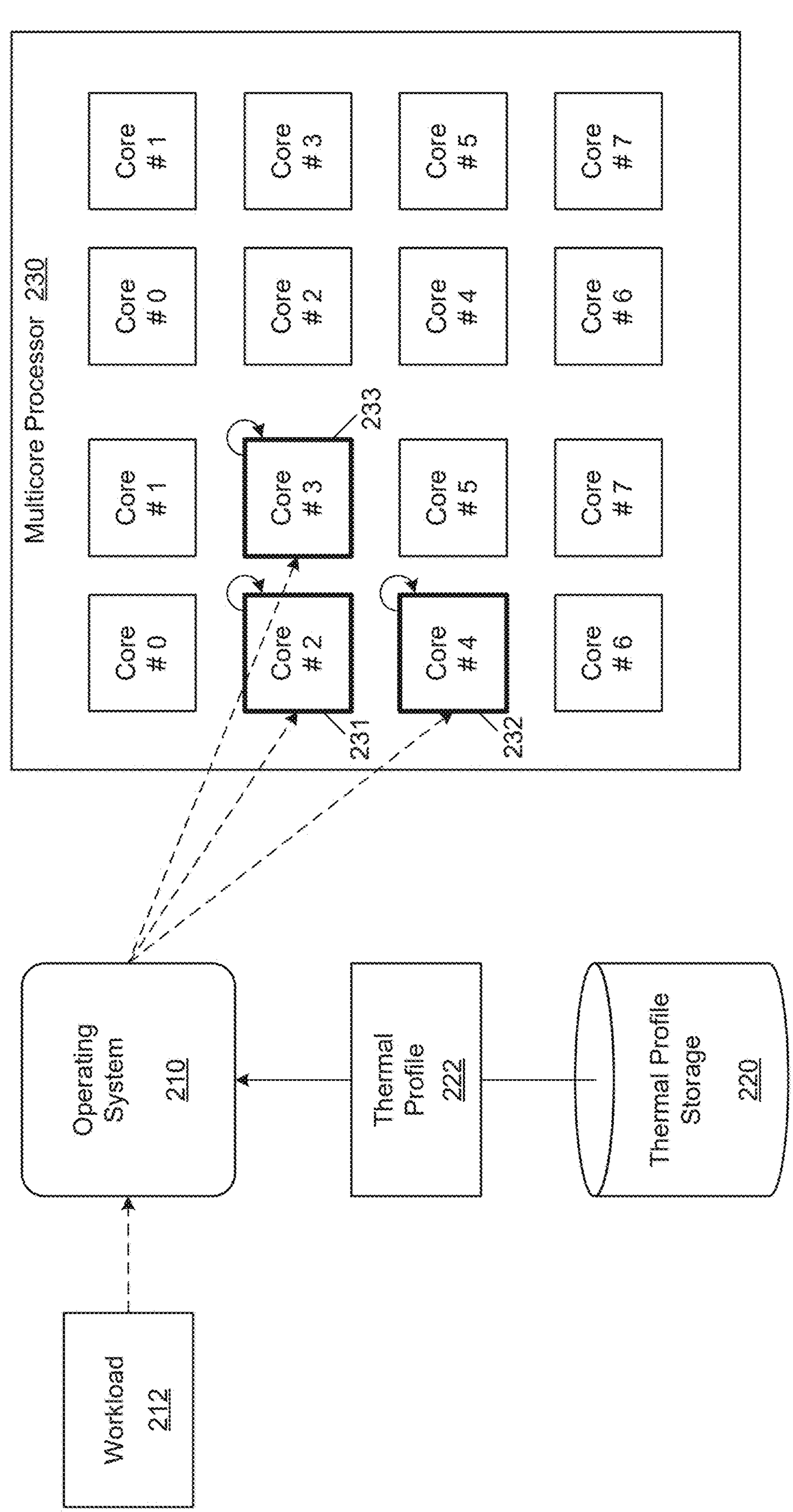
FIG. 2A is a diagram that illustrates operation of a multicore processor based on thermal measurements according to the examples and features of the instant solution.
Figure 2B:
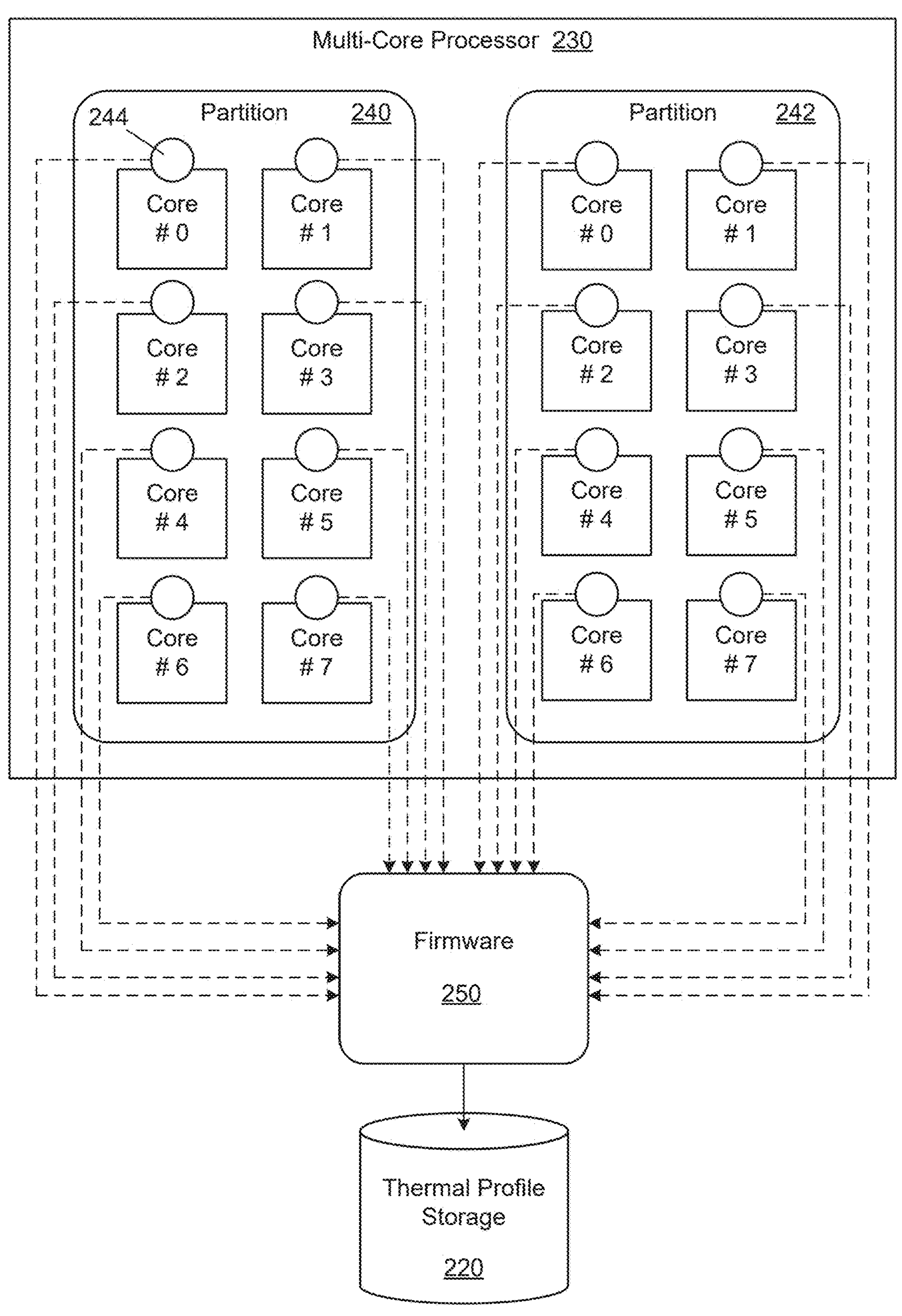
FIG. 2B is another diagram that illustrates operation of a multicore processor based on thermal measurements according to the examples and features of the instant solution.

FIGS. 2A-2B illustrate operation of a multicore processor based on thermal measurements according to the examples and features of the instant solution. For example, FIG. 2A illustrates a process 200A of dispatching a workload 212 to a subset of cores of a multicore processor 230 according to example embodiments. Referring to FIG. 2A, an operating system 210 may receive a request to execute the workload 212. For example, the request may be provided from a scheduler and may include a process, a thread, etc. that is to be executed by the multicore processor 230. According to various embodiments, the operating system 210 may retrieve a thermal profile 222 of the multicore processor 230 from a thermal profile storage 220 such as a database, data store, etc., and determine an optimal subset of cores 231, 232, and 233 of the multicore processor 230 to perform the workload 212.

In this example, the operating system 210 may dispatch the workload 212 to run simultaneously on each of the optimal subset of cores 231, 232, and 233, based on the thermal profile 222. Here, the operating system 210 may dynamically determine the operating characteristics of the multicore processor 230 (i.e., the optimal subset of cores 231, 232, and 233) regardless of a previous core or cores that were used to run a similar type of workload. Therefore, the workload 212 is not pinned to any particular core or subset of cores, but rather is dynamically dispatched based on thermal properties of the cores in the multicore processor 230.

FIG. 2B illustrates a process 200B of reading measurements captured by thermal sensors from the multicore processor 230 and updating a thermal profile associated with the multicore processor 230 based on the measurements captured by the thermal sensors. In this example, the multicore processor 230 includes two partitions of cores including a first partition 240 and a second partition 242. Each partition includes eight cores. It should be appreciated that the arrangement of partitions and cores shown in FIG. 2B is just an example, and more or less partitions may be present and that the partitions may include more or less cores.

According to various embodiments, thermal sensors 244 may be embedded within one or more components of the multicore processor 230. As an example, thermal sensors 244 may be embedded within a processing core, an L2 cache, and L3 cache, a chip, a drawer, an I/O adapter, a memory, and the like. In some embodiments, the thermal sensors 244 may be digital thermal sensors, infrared sensors, integrated circuit (IC) sensors, or the like. The thermal sensors 244 may be read by firmware 250 of the computing system where the multicore processor 230 is installed. In this case, the firmware 250 may read the thermal sensors 244 at periodic intervals, for example, at startup, during runtime, etc.

Furthermore, the firmware 250 may generate a thermal profile of multicore processor 230 based on the thermal measurements by the thermal sensors 244. As an example, the multicore processor 230 may be provided with a default thermal profile that is generated during manufacture. The default thermal profile may include thermal measurements, scores, etc. for the different processing cores. In some cases multiple default thermal profiles may be provided for multiple different types of work. The firmware 250 may receive the thermal measurements from the thermal sensors 244, and update the initial/default thermal values stored in the thermal profile based on runtime/workload statistics of the workloads being executed by the multicore processor using the plurality of cores. Thus, the firmware 250 may update the operating characteristics of the cores based on the thermal measurements that occur over time.

Figure 3A:
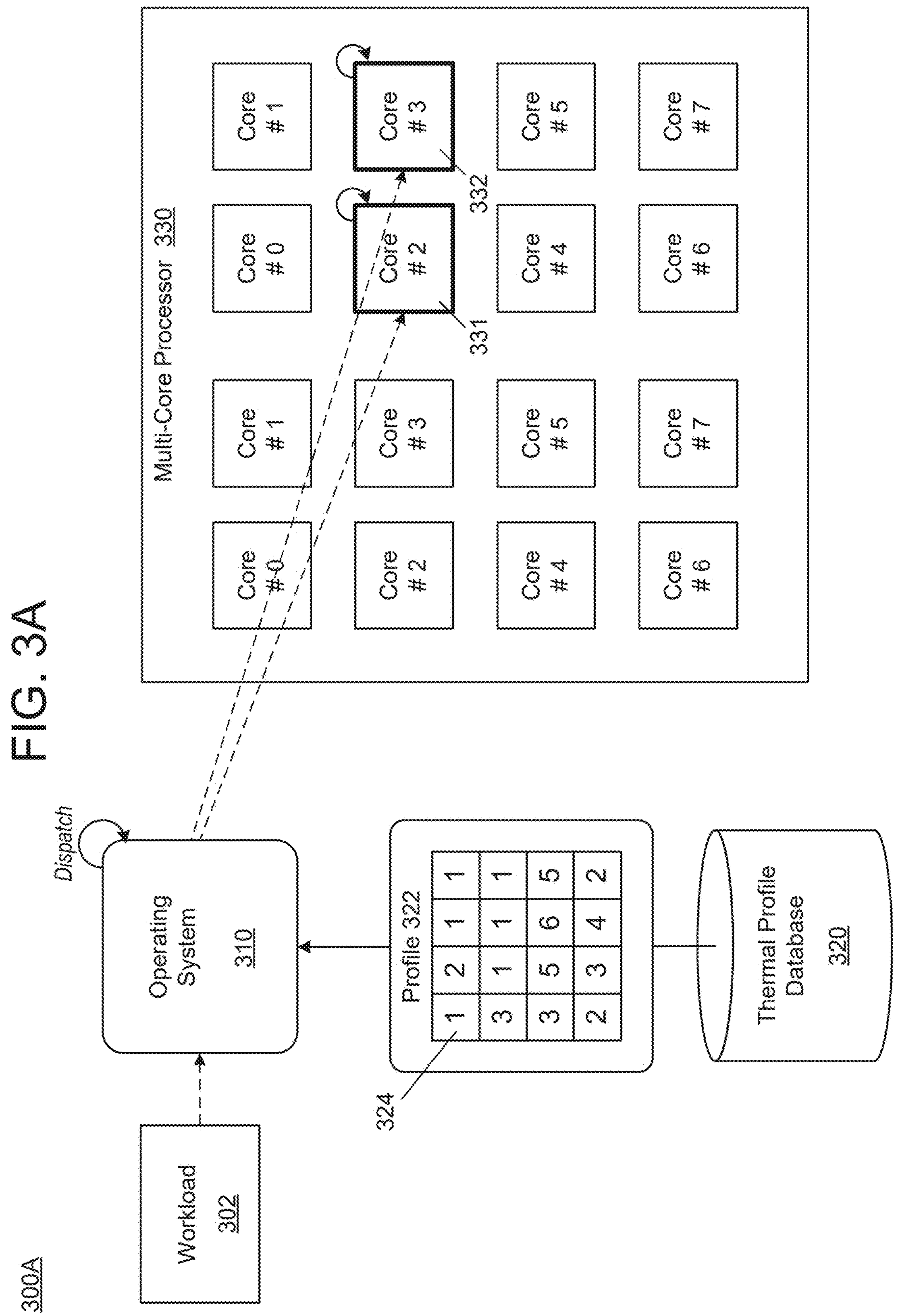
FIG. 3A is a diagram that illustrates a process of modifying a thermal profile and dispatching tasks based on the modified thermal profile according to the examples and features of the instant solution.
Figure 3C:
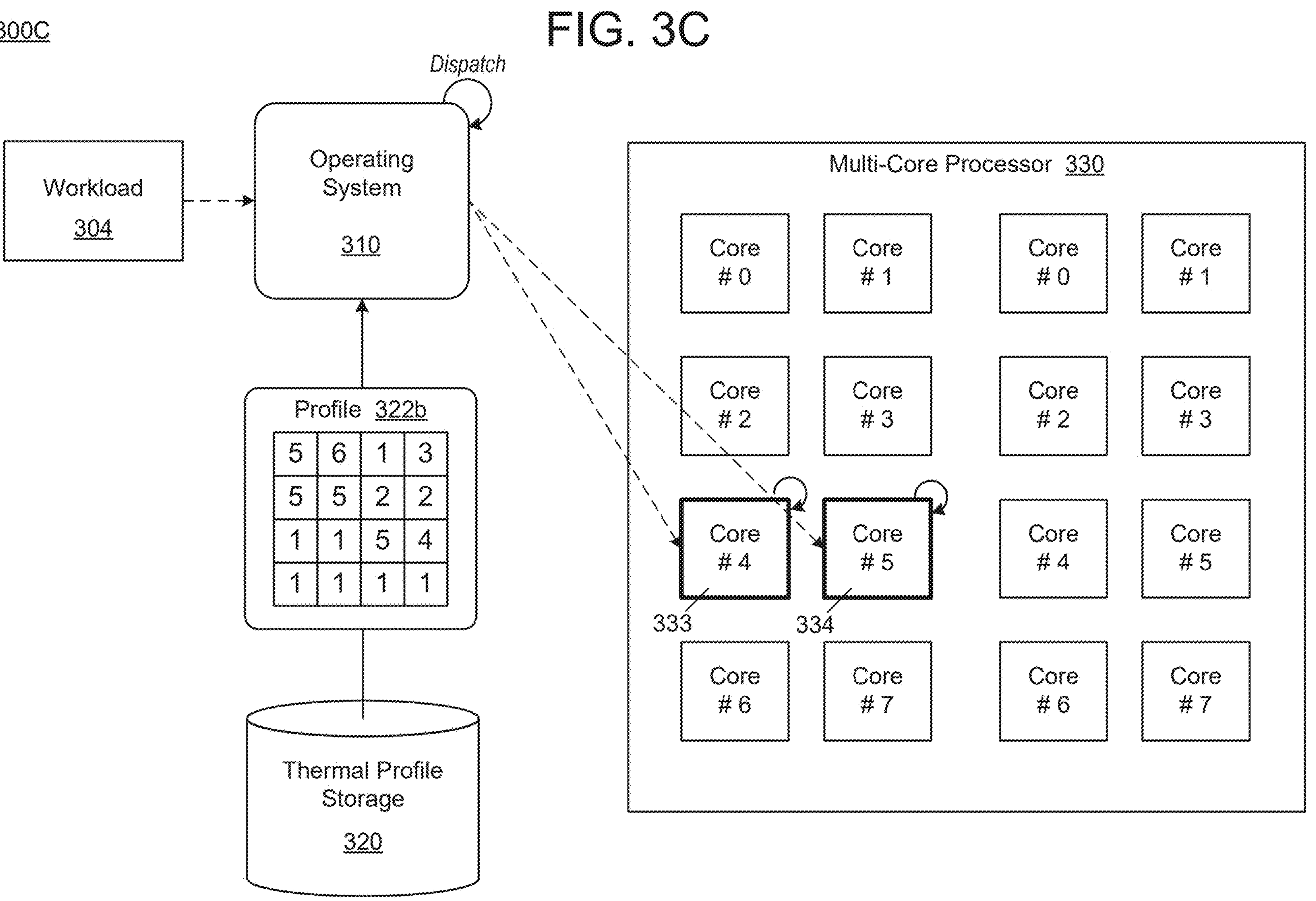
FIG. 3C is yet another diagram that illustrates a process of modifying a thermal profile and dispatching tasks based on the modified thermal profile according to the examples and features of the instant solution.

FIGS. 3A-3C illustrate a process of modifying a thermal profile and dispatching tasks based on the modified thermal profile according to the examples and features of the instant solution. For example, FIG. 3A illustrates a process 300A of dispatching a workload 302 to a subset of cores including a core 331 and a core 332 of a multicore processor 330 based on a thermal profile 322 of the multicore processor 330. In this example, the thermal profile 322 may be the "default" thermal profile that is provided with the multicore processor 330 and stored within a thermal profile database 320.

For example, the thermal profile 322 may be embodied as a table with a plurality of cells 324 corresponding to a plurality of cores of the multicore processor 330. In this example, each core includes its own cell in the table. Inside the cells are power profile values which may identify how hot a core is from 1 to 10, where 1 is the coolest value and 10 is the hottest value. The values may be generated by a machine learning model which receives raw thermal measurements (e.g., temperature values) and converts them into a score or numerical value that identifies how hot the core is.

In this example, the operating system 310 selects the core 331 and the core 332 based on the scores of the core 331 and the core 332 in the table. Accordingly, the operating system 310 dispatches the workload 302 to the core 331 and the core 332 for simultaneous processing. The workload 302 may be a thread, a program, or the like, and may include one or more different tasks to be performed. The dispatching of the workload 302 to the core 331 and the core 332 causes the core 331 and the core 332 to execute the workload 302.

FIG. 3B illustrates a process 300B of changing of the thermal profile 322 based on updated thermal measurements from the thermal sensors from the multicore processor according to example embodiments. Referring to FIG. 3B, firmware 340 may receive updated thermal measurements from the thermal sensors of the multicore processor. For example, thermal sensors embedded with each of the processing cores of the multicore processor may provide updated thermal measurements to the firmware 340.

In response, the firmware 340 may retrieve the thermal profile 322 from the thermal profile database 320 and may modify the thermal profile 322 to generate a modified thermal profile **322*b* based on the thermal measurements of the thermal sensors. For example, the firmware 340 may detect changes in the temperature values of the different cores and modify cells 324 within the table of the thermal profile 322 to generate modified cells 324*b* of the table which are included in the modified thermal profile 322*b***.

In some embodiments, the previous thermal values in the cells may be removed and replaced with the new values generated from the updated thermal measurements from the processing cores. As another example, the previous thermal values may be aggregated with the new thermal values and may be used in combination to generate the modified thermal values in the table of the modified thermal profile **322*b*. For example, an average may be detected, or the like. Here, the thermal values may be the temperature measurements, power measurements, or indirect values such as rankings, scores, etc., that are generated by inputting the raw measurements into a machine learning model, or the like. After modifying the thermal profile 322 to create the modified thermal profile 322***b*, the firmware 340 may store the modified thermal profile 322*b* in the thermal profile database 320. Here, the modified thermal profile 322*b* may replace the thermal profile 322 that was previously held by the thermal profile database 320.

When the operating system 310 dispatches a next workload to the multicore processor 330, the operating system 310 may refer to the modified thermal profile 322*b* instead of the thermal profile 322. For example, FIG. 3C illustrates a process 300C of dispatching a workload 304 to the multicore processor 330 based on the modified thermal profile 322*b*. In this example, the operating system 310 receives the workload 304, for example, from a scheduler, and accesses the modified thermal profile 322*b* within the thermal profile database 320. For example, the operating system 310 may read thermal values stored within the modified thermal profile 322*b* from the thermal profile database 320, and identify an optimal set of cores for executing the workload 304 based on the modified thermal values of the cores stored within the table of the modified thermal profile 322*b*.

In this example, the operating system 310 identifies cores 333 and 334 as the optimal cores for executing the workload 304 based on the modified thermal profile 322*b*, and dispatches the workload 304 to the cores 333 and 334. The updates to the thermal profile may continue on an iterative basis. In some embodiments, the updates may be performed once an hour, once a day, once a week, etc. Over time, the thermal profile may provide an indication of which cores are running hot, and which are not, thereby enabling the operating system 310 to dispatch work based on thermal data, rather than affinity, etc.

In some embodiments, the firmware may maintain multiple thermal profiles for the multicore processor based on multiple different types of work/jobs that can be performed by the multicore processor. For example, a database transaction may cause a processor core to run hotter than other processor cores, while a computation may cause the same processor core to run cooler than other processor cores.

Figure 4A:
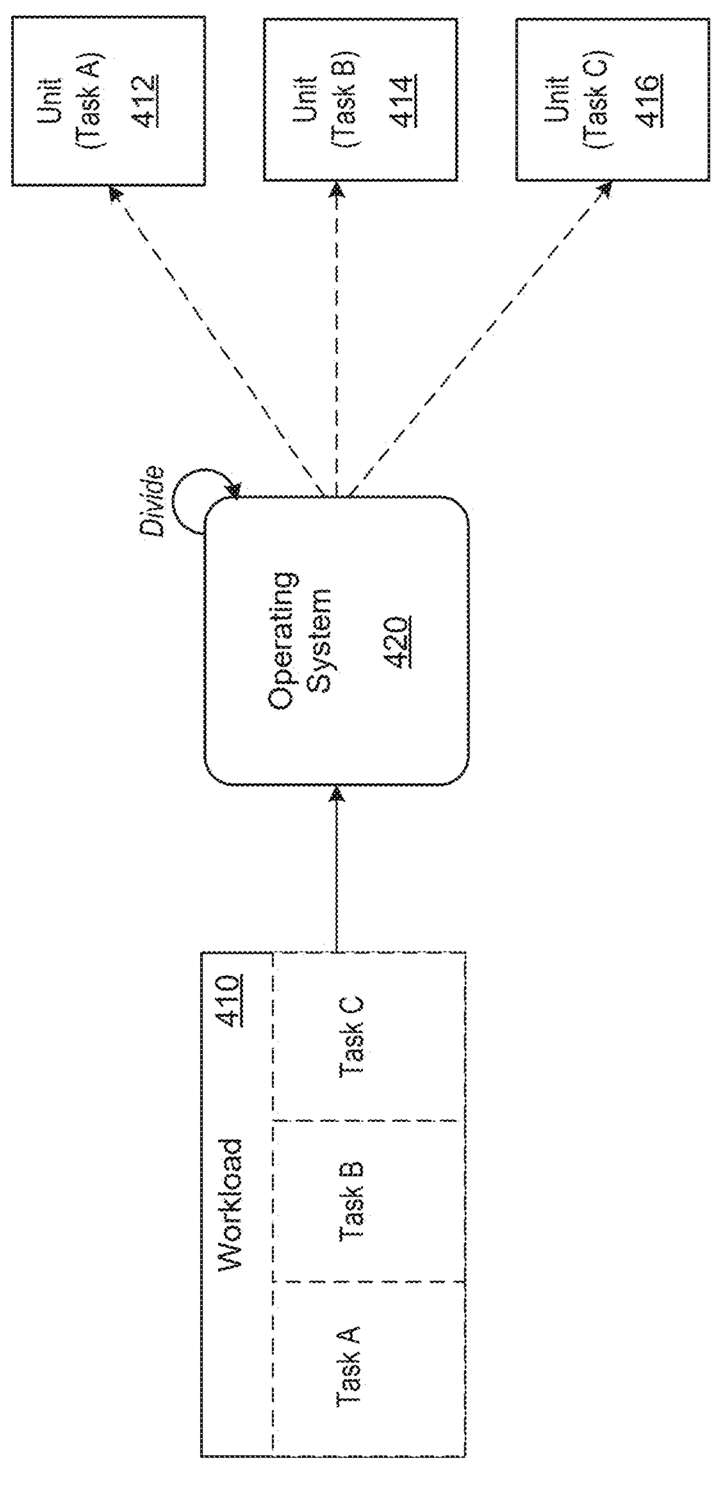
FIG. 4A is a diagram that illustrates a process of mixing execution of different tasks from a workload according to the examples and features of the instant solution.
Figure 4B:
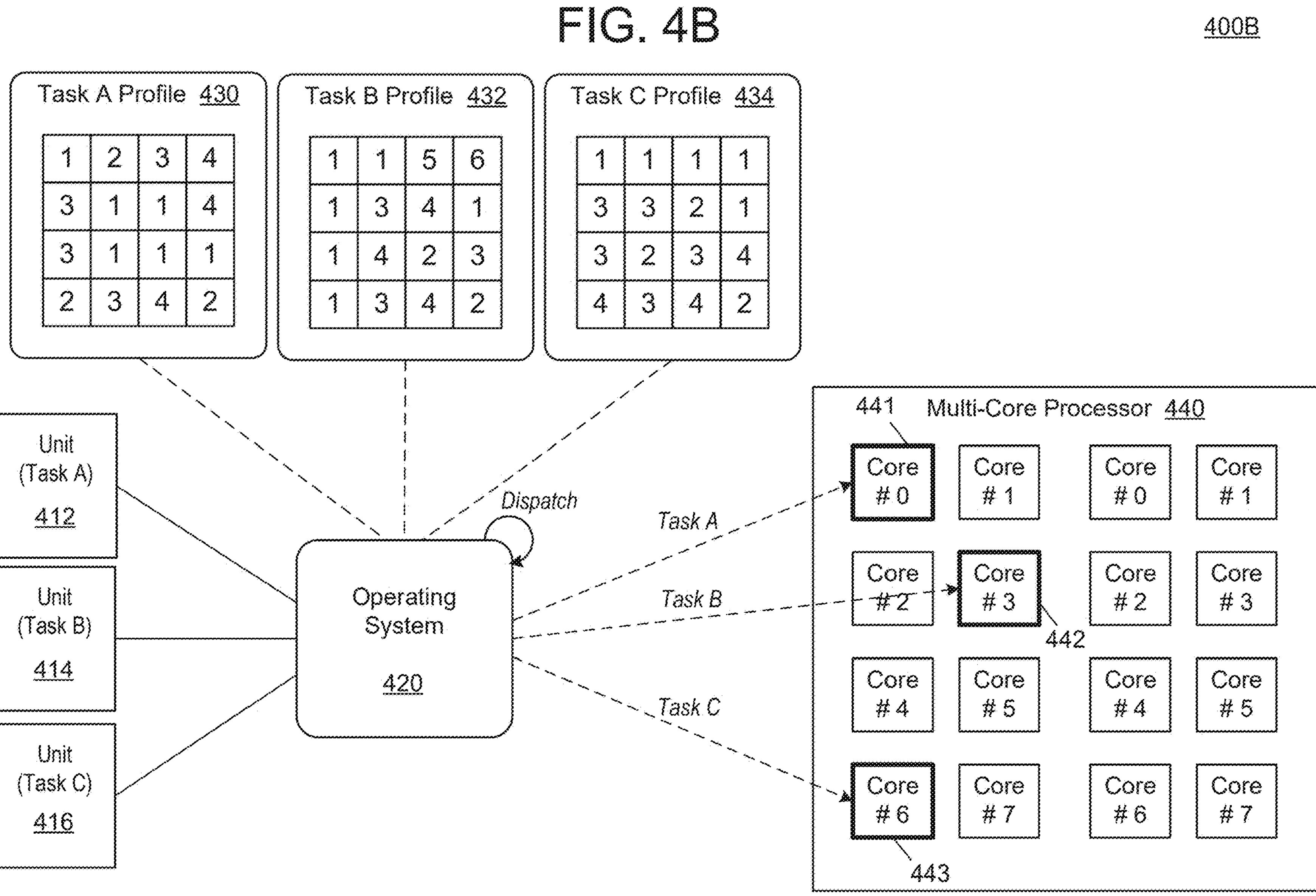
FIG. 4B is a diagram that illustrates a process of mixing execution of different tasks from a workload according to the examples and features of the instant solution.

FIGS. 4A-4B illustrate a process of mixing execution of different tasks from a workload according to the examples and features of the instant solution. For example, FIG. 4A illustrates a process 400A of breaking up a workload 410 into a plurality of sub tasks based on types of programs to be executed by the multicore processor when performing the workload 410. In this example, an operating system 420 may receive the workload 410 and identify three different sub task including a table scan (task A), a computation (task B), and a computation (task C), and divide the workload into three units of work 412, 414, and 416 corresponding to the three sub tasks. Here, the three units of work 412, 414, and 416 correspond to different types of tasks to be executed by the processor.

FIG. 4B illustrates a process 400B of mixing the three units of work 412, 414, and 416 among different processing cores to obtain the most heat efficient/power efficient result for the processor as a whole. Referring to FIG. 4B, the operating system 420 maintains a plurality of thermal profiles 430, 432, and 434, corresponding to a plurality of different types of tasks. The operating system 420 may receive the units of work 412, 414, and 416 and may dispatch the units of work 412, 414, and 416, among different cores of a multicore processor 440 based on the thermal attributes in the thermal profiles 430, 432, and 434.

Here, the operating system 420 determines to dispatch the unit of work 412 to a processing core 442, the unit of work 414 to the processing core 443, and the unit of work 416 to the processing core 441. The decision on which cores to use is determined based on the task types of the units of work, and the thermal profiles of the different task types with respect to the cores in the multicore processor 440. As more workloads are run on the multicore processor 440, more thermal readings can be captured from thermal sensors embedded therein, and used by firmware (not shown) to update the thermal profiles 430, 432, and 434 for future dispatching operations by the operating system 420.

Figure 5A:
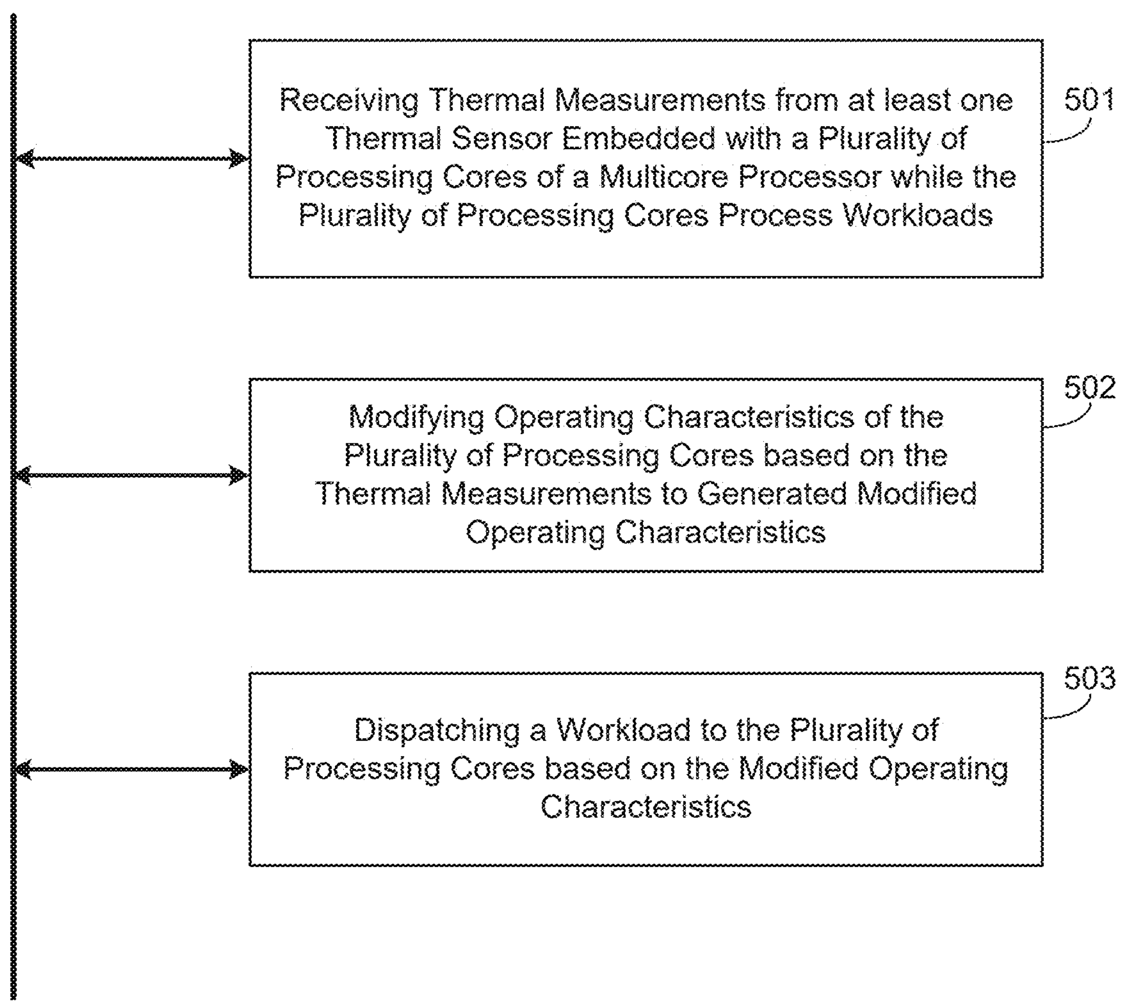
FIG. 5A illustrates a flow diagram, according to example embodiments.

FIG. 5A illustrates a flow diagram of a method 500, according to example embodiments. Referring to FIG. 5A, the method 500 may include receiving thermal measurements from at least one thermal sensor embedded with a plurality of processing cores of a multicore processor while the plurality of processing cores process workloads in 501. The method may further include modifying operating characteristics of the plurality of processing cores based on the thermal measurements to generate modified operating characteristics in 502. The method may further include dispatching a workload to the plurality of processing cores based on the modified operating characteristics in 503.

Figure 5B:
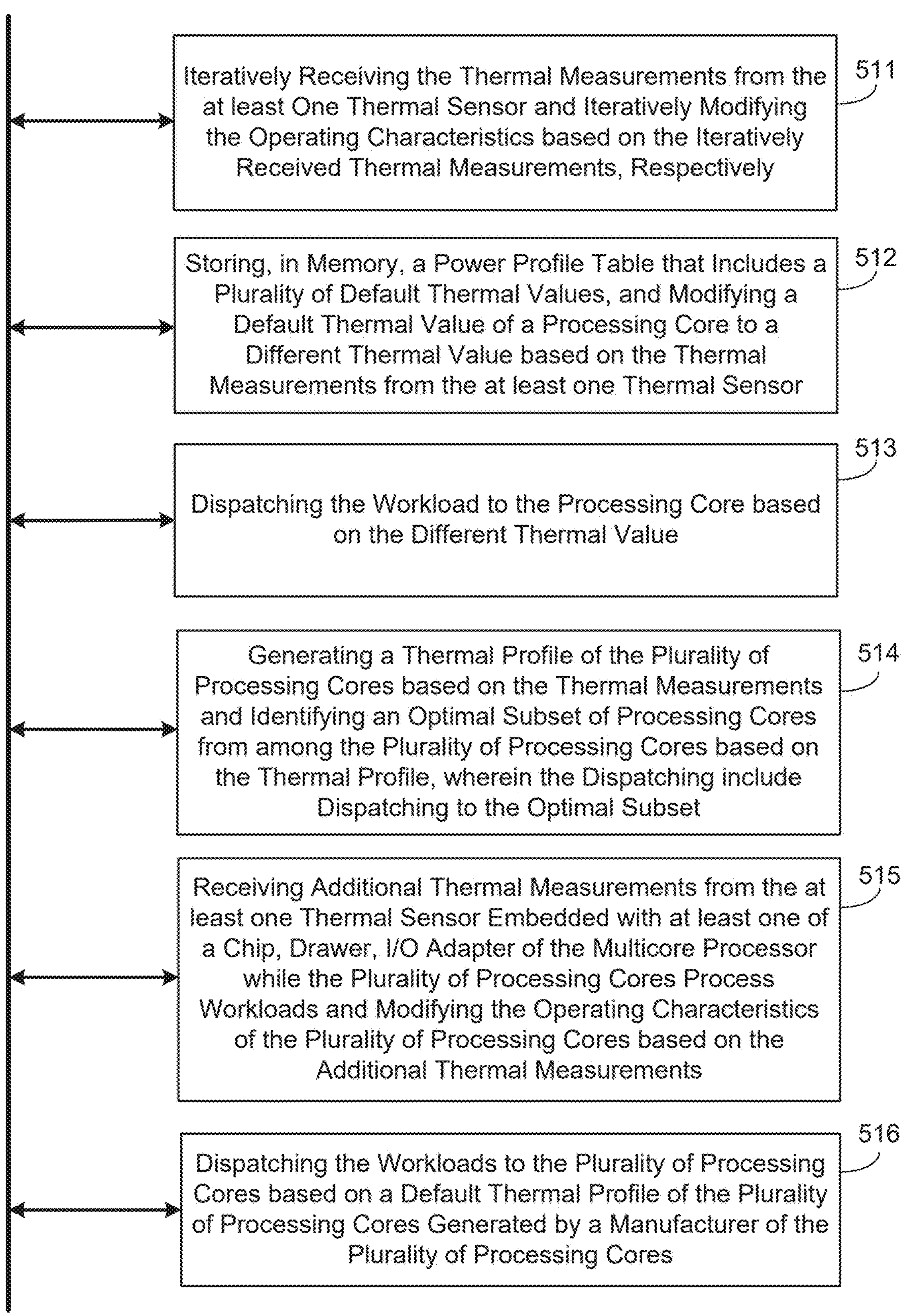
FIG. 5B illustrates a flow diagram, according to example embodiments.

FIG. 5B illustrates a flow diagram of a method 510, according to example embodiments. Referring to FIG. 5B, the method 510 may further include iteratively receiving the thermal measurements from the at least one thermal sensor and iteratively modifying the operating characteristics based on the iteratively received thermal measurements, respectively, in 511. In some embodiments, the method may further include storing, in memory, a power profile table comprising a plurality of default thermal values of the plurality of processing cores, and modifying a default thermal value of a processing core to a different thermal value based on the thermal measurements from the at least one thermal sensor in 512. In some embodiments, the dispatching may include dispatching the workload to the processing core based on the different thermal value in 513.

In some embodiments, the method may further include generating a thermal profile of the plurality of processing cores based on the thermal measurements and identifying an optimal subset of processing cores from among the plurality of processing cores based on the thermal profile, wherein the dispatching comprises dispatching the workload to the optimal subset of processing cores in 514. In some embodiments, the method may further include receiving additional thermal measurements from at least one thermal sensor embedded with at least one of a chip, a drawer, and an input/output (I/O) adapter of the multicore processor while the plurality of processing cores process workloads, wherein the modifying further comprises modifying the operating characteristics of the plurality of processing cores based on the additional thermal measurements in 515. In some embodiments, the method may further include dispatching the workloads to the plurality of processing cores based on a default thermal profile of the plurality of processing cores generated during manufacturing of the plurality of processing cores in 516.

Figure 6A:
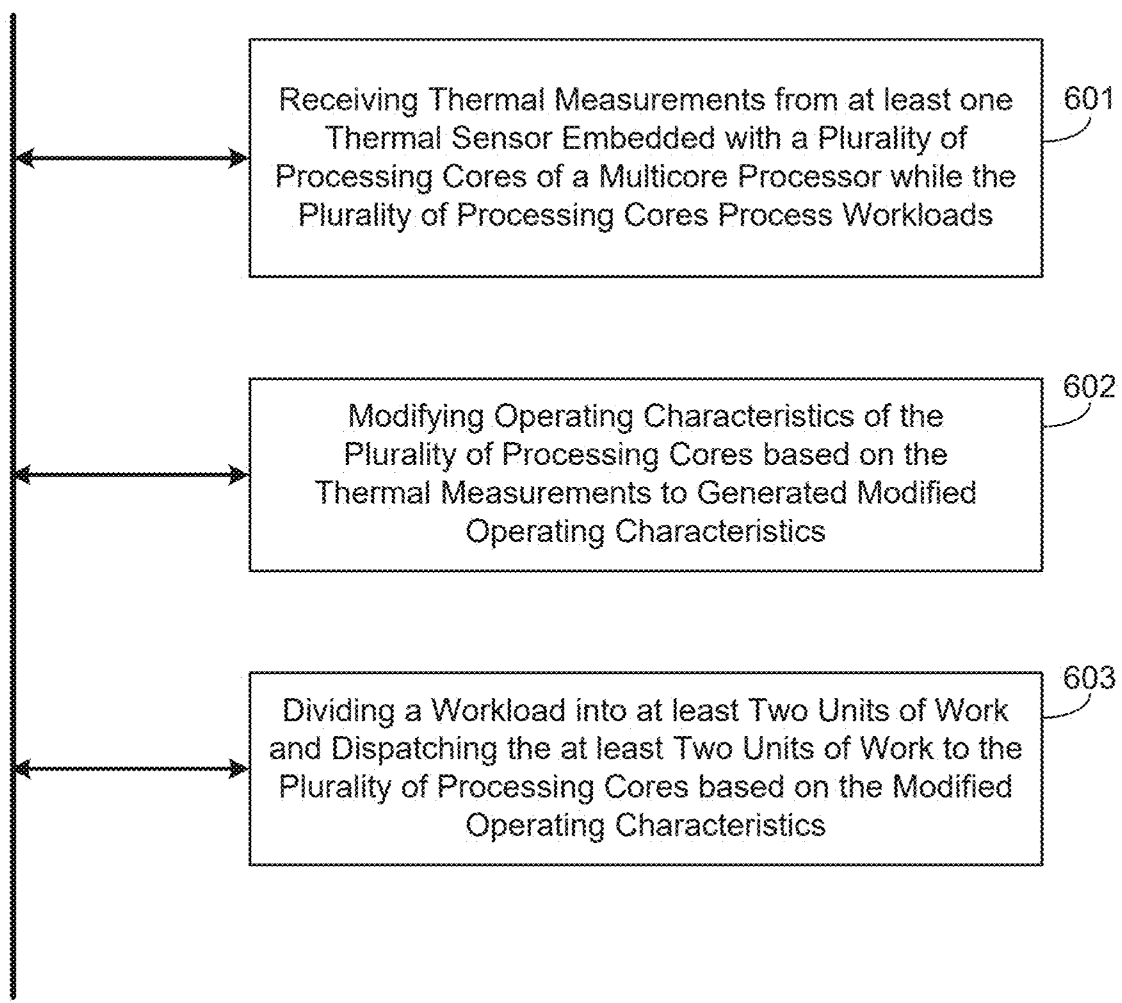
FIG. 6A illustrates a flow diagram, according to example embodiments.

FIG. 6A illustrates a flow diagram of a method 600, according to example embodiments. Referring to FIG. 6A, the method 600 may include receiving thermal measurements from at least one thermal sensor embedded with a plurality of processing cores of a multicore processor while the plurality of processing cores process workloads in 601. The method may further include modifying operating characteristics of the plurality of processing cores based on the thermal measurements from the at least one thermal sensor to generate modified operating characteristics in 602. The method may further include dividing the workload into at least two units of work and dispatching the at least two units of work to at least two processing cores of the plurality of processing cores, based on the modified operating characteristics in 603.

Figure 6B:
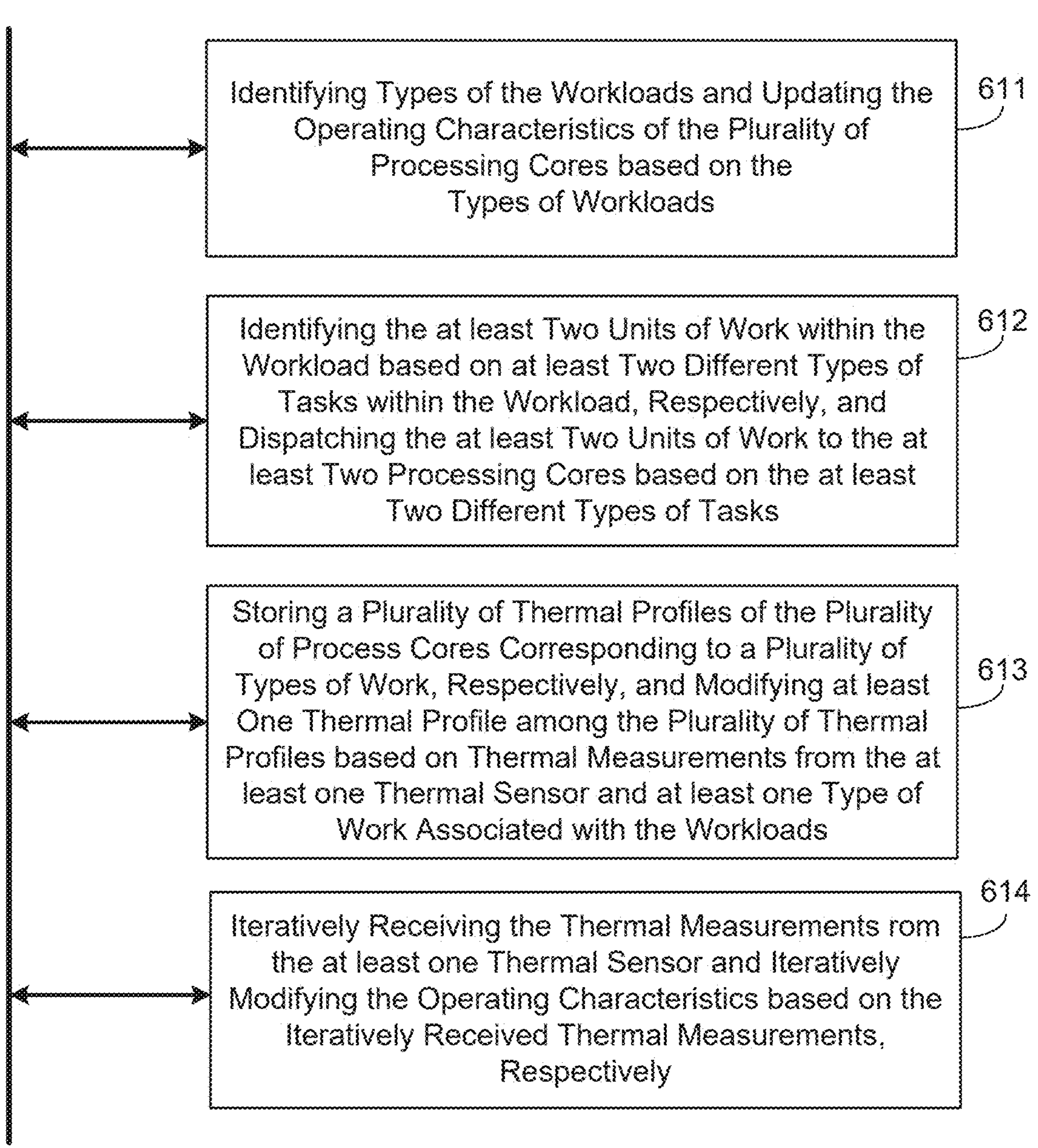
FIG. 6B illustrates a flow diagram, according to example embodiments.

FIG. 6B illustrates a flow diagram of a method 610, according to example embodiments. Referring to FIG. 6B, the method 610 may include identifying types of the workloads, wherein the modifying may include updating the operating characteristics of the plurality of processing cores based on the types of the workloads in 611. In some embodiments, the method may further include identifying the at least two units of work within the workload based on at least two different types of tasks within the workload, respectively, wherein the dispatching further comprises dispatching the at least two units of work to the at least two processing cores based on the at least two different types of tasks in 612.

In some embodiments, the method may further include storing a plurality of thermal profiles of the plurality of processing cores corresponding to a plurality of types of work, respectively, wherein the modifying may include updating at least one thermal profile among the plurality of thermal profiles based on the thermal measurements from the at least one thermal sensor and at least one type of work associated with the workloads in 613. In some embodiments, the method may further include iteratively receiving the thermal measurements from the at least one thermal sensor and iteratively modifying the operating characteristics based on the iteratively received thermal measurements, respectively.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

What is claimed is:

1. An apparatus comprising:

a memory; and a processor communicatively coupled to the memory, the processor configured to:

receive thermal measurements from at least one thermal sensor embedded within at least one processing core of a multicore processor while the plurality of processing cores process workloads;

modify operating characteristics of the plurality of processing cores based on the thermal measurements from the at least one thermal sensor to generate modified operating characteristics;

store, in the memory, a plurality of thermal profiles of the plurality of processing cores corresponding to a plurality of types of work, respectively;

update at least one thermal profile among the plurality of thermal profiles based on the thermal measurements from the at least one thermal sensor and at least one type of work associated with the workloads;

divide a workload into at least two units of work, the at least two units of work being identified based on at least two different types of tasks within the workload; and dispatch the at least two units of work to at least two processing cores of the plurality of processing cores based on the at least two different types of tasks, the plurality of thermal profiles, and the modified operating characteristics.

2. The apparatus of claim 1, wherein the processor is configured to iteratively receive thermal measurements from the at least one thermal sensor and iteratively modify the operating characteristics based on the iteratively received thermal measurements, respectively.

3. The apparatus of claim 1, wherein the memory is configured to store a power profile table comprising a plurality of default thermal values of the plurality of processing cores, and the processor is configured to modify a default thermal value of a processing core to a different thermal value based on the thermal measurements from the at least one thermal sensor.

4. The apparatus of claim 3, wherein the processor is configured to dispatch the workload to the processing core based on the different thermal value.

5. The apparatus of claim 1, wherein the processor is configured to generate a thermal profile of the plurality of processing cores based on the thermal measurements, identify an optimal subset of processing cores from among the plurality of processing cores based on the thermal profile, and dispatch the at least two units of work to the optimal subset of processing cores.

6. The apparatus of claim 1, wherein the processor is configured to receive additional thermal measurements from at least one thermal sensor embedded with at least one of a chip, a drawer, and an input/output (I/O) adapter of the multicore processor while the plurality of processing cores process workloads, and modify the operating characteristics of the plurality of processing cores based on the additional thermal measurements.

7. The apparatus of claim 1, wherein the processor is configured to dispatch the workloads to the plurality of processing cores based on a default thermal profile of the plurality of processing cores generated during a manufacture of the plurality of processing cores.

8. A method comprising:

receiving thermal measurements from at least one thermal sensor embedded within at least one processing core of a multicore processor while the plurality of processing cores process workloads;

modifying operating characteristics of the plurality of processing cores based on the thermal measurements to generate modified operating characteristics;

storing, in memory, a plurality of thermal profiles of the plurality of processing cores corresponding to a plurality of types of work, respectively;

updating at least one thermal profile among the plurality of thermal profiles based on the thermal measurements from the at least one thermal sensor and at least one type of work associated with the workloads;

dividing a workload into at least two units of work, the at least two units of work being identified based on at least two different types of tasks within the workload; and dispatching the at least two units of work to at least two processing cores of the plurality of processing cores based on the at least two different types of tasks, the plurality of thermal profiles, and the modified operating characteristics.

9. The method of claim 8, comprising iteratively receiving the thermal measurements from the at least one thermal sensor and iteratively modifying the operating characteristics based on the iteratively received thermal measurements, respectively.

10. The method of claim 8, comprising storing, in memory, a power profile table comprising a plurality of default thermal values of the plurality of processing cores, and modifying a default thermal value of a processing core to a different thermal value based on the thermal measurements from the at least one thermal sensor.

11. The method of claim 10, wherein the dispatching comprises dispatching the workload to the processing core based on the different thermal value.

12. The method of claim 8, comprising generating a thermal profile of the plurality of processing cores based on the thermal measurements and identifying an optimal subset of processing cores from among the plurality of processing cores based on the thermal profile, wherein the dispatching comprises dispatching the at least two units of work to the optimal subset of processing cores.

13. The method of claim 8, comprising receiving additional thermal measurements from at least one thermal sensor embedded with at least one of a chip, a drawer, and an input/output (I/O) adapter of the multicore processor while the plurality of processing cores process workloads, wherein the modifying further comprises modifying the operating characteristics of the plurality of processing cores based on the additional thermal measurements.

14. The method of claim 8, comprising dispatching the workloads to the plurality of processing cores based on a default thermal profile of the plurality of processing cores generated during manufacturing of the plurality of processing cores.

15. A computer-readable storage medium comprising instructions which when executed by a processor cause the processor to perform:

receiving thermal measurements from at least one thermal sensor embedded within at least one processing core of a multicore processor while the plurality of processing cores process workloads;

modifying operating characteristics of the plurality of processing cores based on the thermal measurements from the at least one thermal sensor to generate modified operating characteristics;

storing, in memory, a plurality of thermal profiles of the plurality of processing cores corresponding to a plurality of types of work, respectively;

updating at least one thermal profile among the plurality of thermal profiles based on the thermal measurements from the at least one thermal sensor and at least one type of work associated with the workloads;

dividing a workload into at least two units of work, the at least two units of work being identified based on at least two different types of tasks within the workload; and dispatching the at least two units of work to at least two processing cores of the plurality of processing cores based on the at least two different types of tasks, the plurality of thermal profiles, and the modified operating characteristics.

16. The computer-readable storage medium of claim 15, wherein the processor is further configured to perform iteratively receiving the thermal measurements from the at least one thermal sensor and iteratively modifying the operating characteristics based on the iteratively received thermal measurements, respectively.

17. The computer-readable storage medium of claim 15, wherein the processor is further configured to perform storing, in memory, a power profile table comprising a plurality of default thermal values of the plurality of processing cores, and modifying a default thermal value of a processing core to a different thermal value based on the thermal measurements from the at least one thermal sensor.

18. The computer-readable storage medium of claim 17, wherein the dispatching comprises dispatching the workload to the processing core based on the different thermal value.

19. The computer-readable storage medium of claim 15, wherein the processor is further configured to perform generating a thermal profile of the plurality of processing cores based on the thermal measurements and identifying an optimal subset of processing cores from among the plurality of processing cores based on the thermal profile, wherein the dispatching comprises dispatching the at least two units of work to the optimal subset of processing cores.

20. The computer-readable storage medium of claim 15, wherein the processor is further configured to perform receiving additional thermal measurements from at least one thermal sensor embedded with at least one of a chip, a drawer, and an input/output (I/O) adapter of the multicore processor while the plurality of processing cores process workloads, wherein the modifying further comprises modifying the operating characteristics of the plurality of processing cores based on the additional thermal measurements.

* * * * *